United States Patent [19]

Keffeler et al.

[11] Patent Number: 5,052,881
[45] Date of Patent: Oct. 1, 1991

[54] BEARING MOUNTING ARRANGEMENT FOR A LIFT MAST

[75] Inventors: Gary L. Keffeler, Lacon, Ill.; Milford D. McVeen, Chagrin Falls, Ohio

[73] Assignee: Caterpillar Industrial Inc., Mentor, Ohio

[21] Appl. No.: 619,373

[22] Filed: Nov. 28, 1990

[51] Int. Cl.⁵ .............................................. B60P 1/04
[52] U.S. Cl. ................................... 414/634; 414/667; 384/291; 187/10
[58] Field of Search .................... 187/9 R, 9 E, 10, 95; 414/631, 632, 634, 635, 636, 637, 638, 667, 671; 384/289, 291, 373, 377, 903

[56] References Cited

U.S. PATENT DOCUMENTS

| | | | |
|---|---|---|---|
| 2,469,186 | 5/1949 | Tydeman | 384/291 X |
| 3,319,816 | 5/1967 | Christenson | 187/9 E X |
| 3,556,247 | 1/1971 | Shinoda et al. | 187/95 |
| 3,819,078 | 6/1974 | Walsh | 414/671 |
| 3,893,580 | 7/1975 | Stevens | 214/672 |
| 4,100,986 | 7/1978 | Shipitalo | 180/75 |
| 4,105,267 | 8/1978 | Mori | 384/291 |

Primary Examiner—Robert P. Olszewski
Assistant Examiner—Dean A. Reichard
Attorney, Agent, or Firm—Alan J. Hickman

[57] ABSTRACT

A bearing mounting arrangement for a lift mast assembly has a retaining device which maintains a bearing member from movement relative to a first member of a lift mast assembly and directs a flow of lubricant past a second surface of the bearing member and into a groove opening at a first surface in the bearing member. The retaining device includes an elongated retaining member disposed in an aperture in the bearing member and the first member. The retaining device forcibly engages the bearing member and aligns the apertures in the bearing and first members. The bearing mounting arrangement is particularly useful for mounting a lift mast assembly on a material handling vehicle and a thrust bearing member on a side shaft carriage.

26 Claims, 5 Drawing Sheets

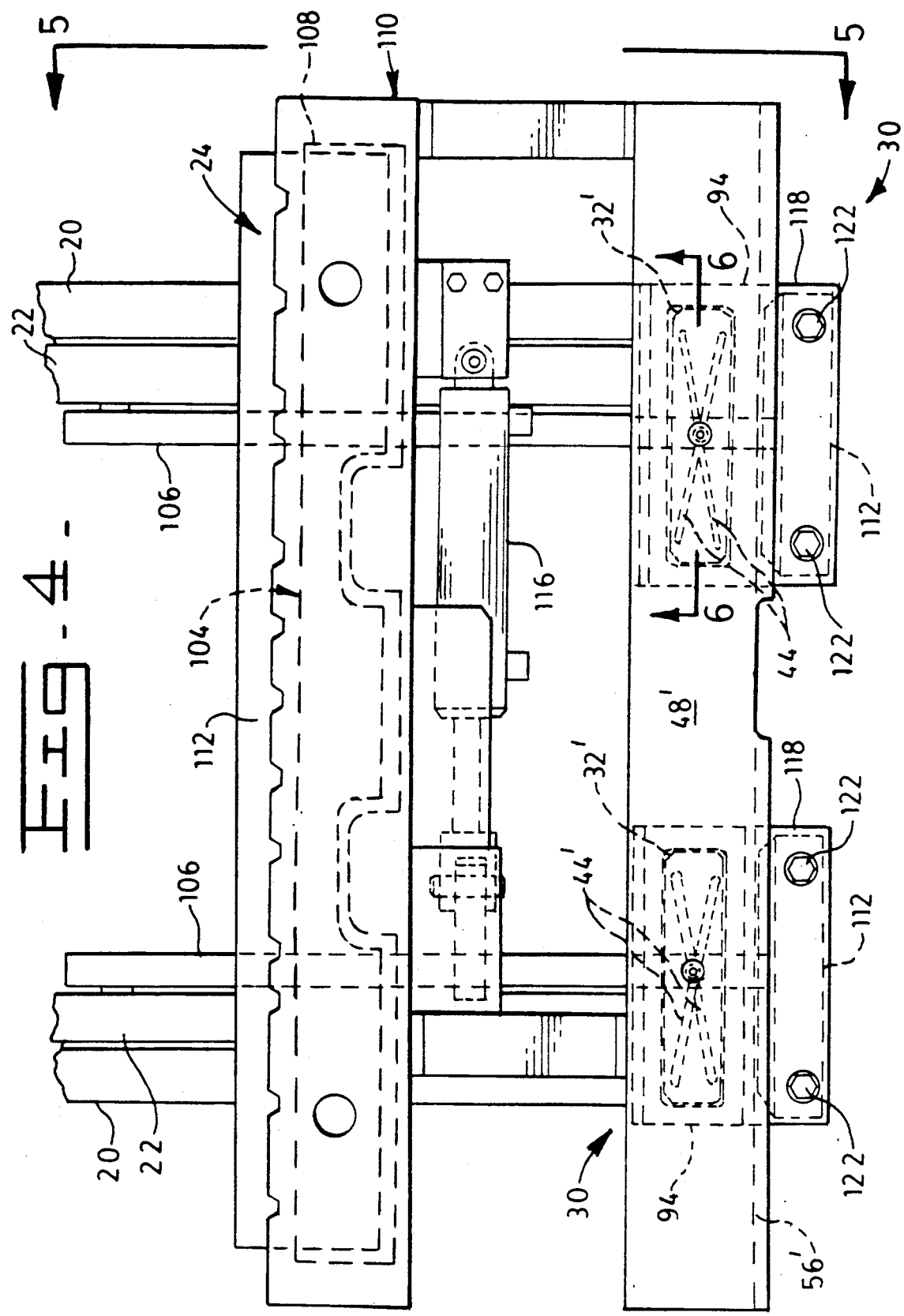

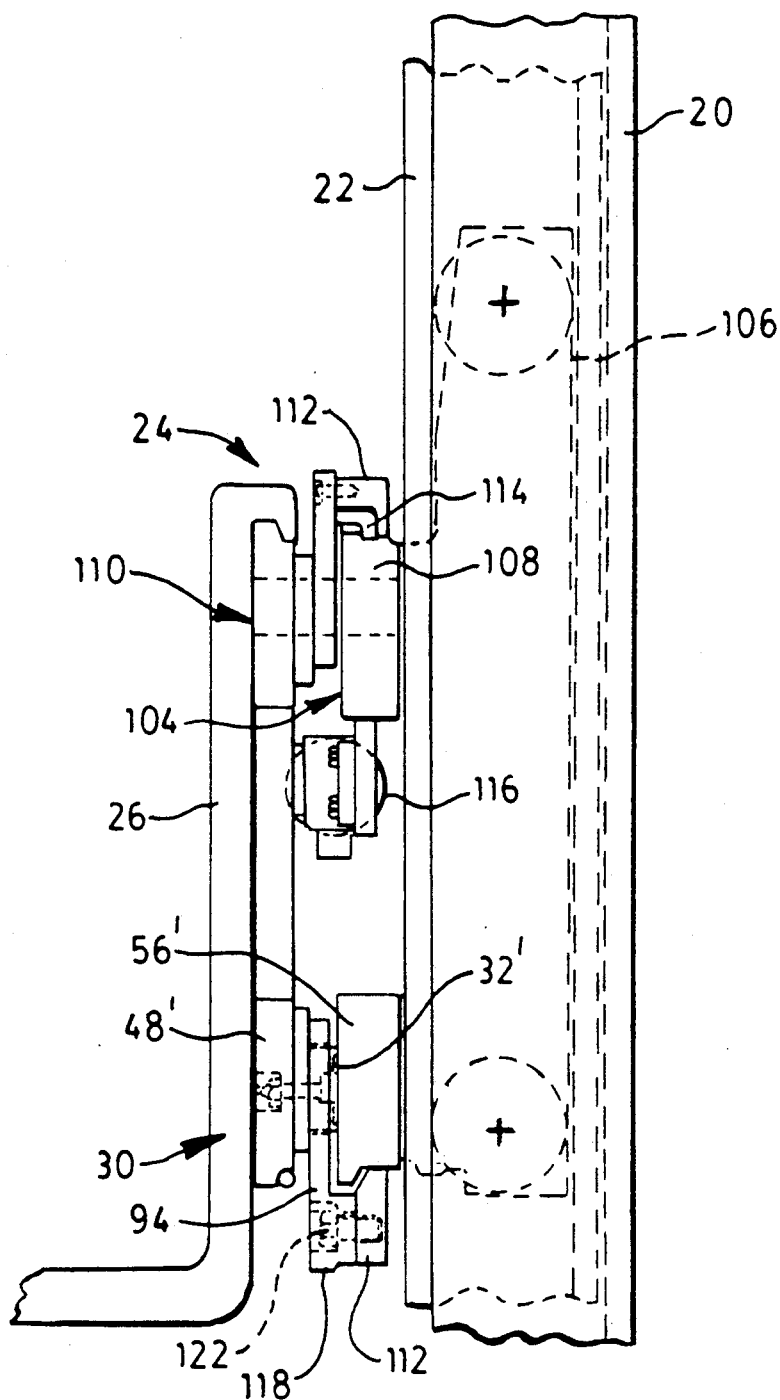

5,052,881

BEARING MOUNTING ARRANGEMENT FOR A LIFT MAST

TECHNICAL FIELD

This invention relates to a bearing mounting arrangement for a lift mast assembly and more particularly to a bearing mounting arrangement in which a retaining apparatus maintains the bearing from sliding movement relative to a first flange and directs lubricating fluid from the first flange through the bearing and into a groove disposed in the bearing.

BACKGROUND ART

Bearing mounting arrangements have been utilized for many years on lift mast assemblies in a variety of ways. In one application, the bearing mounting arrangement is utilized to pivotally attach the lift mast assembly to the material handling vehicle so that the lift mast assembly may pivot about a transverse vehicle axis. An example of such a bearing mounting arrangement is shown in U.S. Pat. No. 3,556,247 to Akibumi Shinoda, dated Jan. 19, 1971. The Shinoda patent discloses a sleeve bearing and a two piece connecting flange mounted on an upright of the lift mast assembly. The two piece flange pivotally connects the lift mast assembly to the material handling vehicle.

Frequently, the sleeve bearing is disposed between the two piece connecting flange and a cylindrical supporting flange. An example of a cylindrical supporting flange is a drive axle housing connected to the frame of the material handling vehicle. U.S. Pat. No. 4,100,986 to William M. Shipitalo, dated July 18, 1978 discloses a such a mounting arrangement. In either patent disclosure the sleeve bearing slidably rotates on the cylindrical supporting flange during pivoting of the mast assembly.

Due to the absence or lack of adequate lubricant in the area of sliding movement of the sleeve bearing premature wearing of the sleeve bearing and the cylindrical supporting flange occurs. This premature wear causes looseness in the connection and affects the operation of the lift mast assembly in a number of ways. For example, a sloppy connection will place excessive side loading on the tilt jacks and cause fluid leakage and tilt jack failure. The loose connection also reduces the vehicle operators ability to accurately position the lift mast assembly and load engaging fork. Thus an increase in load cycle time and a reduction in thruput occurs.

Bearing mounting arrangements are also used in a side shift carriage applications to provide relatively free sliding movement of a side shiftable frame relative to a carriage frame. The bearing mounting arrangement typically connects a plain bearing member to the side shiftable frame and maintains the plain bearing member from transverse movement relative to the side shiftable frame. Due to the absence or lack of adequate lubricant to the proper surface of the plain bearing member the potential for premature wear of the plain bearing member and the carriage frame occurs. Premature wear of the plain bearing causes rubbing and binding of the side shiftable frame relative to the carriage frame. This results in a reduction in the ease of movement of the side shiftable frame and ultimately causes failure of the side shift carriage.

In order to alleviate premature wear of either of the above discussed bearings it is necessary to direct lubricant to the surface of the bearing which bears against the relatively movable frame portion (the cylindrical supporting flange or the carriage frame). In an attempt to solve the problem a hole was provided in the sleeve bearing to pass lubricant from a passage in the connecting flange through the sleeve bearing and to the appropriate side of the sleeve bearing. During operation it was found that the majority of the lubricant would follow the path of least resistance and exit the bearing at the wrong side. It was discovered that over time, dirt and hardened lubricant would plug the hole and cause new fresh lubricant to be blocked from passing to the proper side of the bearing. From visual inspection it appeared that the lubricant was flowing to the proper location, however, premature wear and further inspection after tear down of the bearing mounting arrangement proved otherwise.

In the aforementioned applications the bearings were retained from movement relative to the stationary members (carriage frame and connecting flange) by complicated fastening arrangements. These arrangements included closely toleranced dowel and pin fits, sophisticated bearing carriers and the like. Such retaining methods are expensive to manufacture and less than totally successful in retaining the bearing.

The present invention is directed to overcoming one or more of the problems as set forth above.

DISCLOSURE OF THE INVENTION

In one aspect of the present invention, a bearing mounting arrangement, for a lift mast assembly, includes a bearing member having first and second opposed surfaces, a groove disposed in the bearing member and opening at the first opposed surface, and an aperture disposed in the bearing member and opening into the groove. A first flange has first and second surfaces and an aperture disposed in the first flange and opening at the first and second surfaces. A bearing surface of a second flange member is engaged with the first opposed surface of the bearing member and slidably movable relative to the bearing member. A retaining device is provided for maintaining the bearing member from sliding movement relative to the first flange second surface and for directing lubricating fluid from the aperture in the first flange member, through the aperture in the bearing member, and into the groove.

In another aspect of the invention, a lift mast assembly includes a bearing member, an elongated retaining member, a first flange member and a second flange member. The bearing member has first and second opposed surfaces, a groove disposed in the bearing member and opening at the first opposed surface, and an aperture disposed in the bearing member and opening into the groove. The elongated retaining member has first and second ends and a aperture longitudinally disposed in the elongated retaining member and opening at the first and second ends. The first flange member has first and second surfaces and an aperture disposed in the first flange member and opening at the first and second surfaces. The bearing member second surface faces the first flange first surface. The elongated retaining member is disposed in the apertures of both the first flange and the bearing member and maintains the bearing member from sliding movement relative to the first flange member second surface. The aperture in the elongated retaining member is adapted to direct a lubricant from the first flange member aperture to the groove. A second flange member has a bearing surface.

The bearing surface of the second flange member is slidably engaged with the first surface of the bearing member.

Because the retaining device maintains the bearing member from sliding movement relative to the first flange premature wear of the bearing member and associated componentry due to improper movement of the bearing member is eliminated. Since the retaining device positively prevents misalignment of the apertures in the bearing and the first flange members the potential for lubricant blockage due to misalignment between the apertures is eliminated.

The retaining device also directs lubricant directly to the groove of the bearing member and reduces the potential for a significant amount of the lubricant to seep out from between the bearing member and the first flange. Thus, the potential for premature wear is reduced. Also, since the retaining device is disposed in the aperture of the bearing member the potential for the lubricant in the aperture to become contaminated, to dry out and to plug the hole is reduced.

Further, the addition of a pair of seals on opposite sides of the bearing member seals the bearing member from the environment and reduces the potential for dirt and the like from entering the sealed area and contaminating the lubricant. This not only reduces wear caused by contamination but also reduces the potential for the lubricant to harden and plug the aperture.

BRIEF DESCRIPTION OF THE DRAWINGS

FIG. 4 is a diagrammatic partial front elevational view of the lift mast assembly of FIG. 1 showing the alternate embodiment of the bearing mounting arrangement for a side shift carriage thrust bearing in greater detail;

FIG. 5 is a diagrammatic enlarged side elevational view taken along lines 5—5 of FIG. 4 showing the second embodiment of the present invention in greater detail.

BEST MODE FOR CARRYING OUT THE INVENTION

Figure 1:
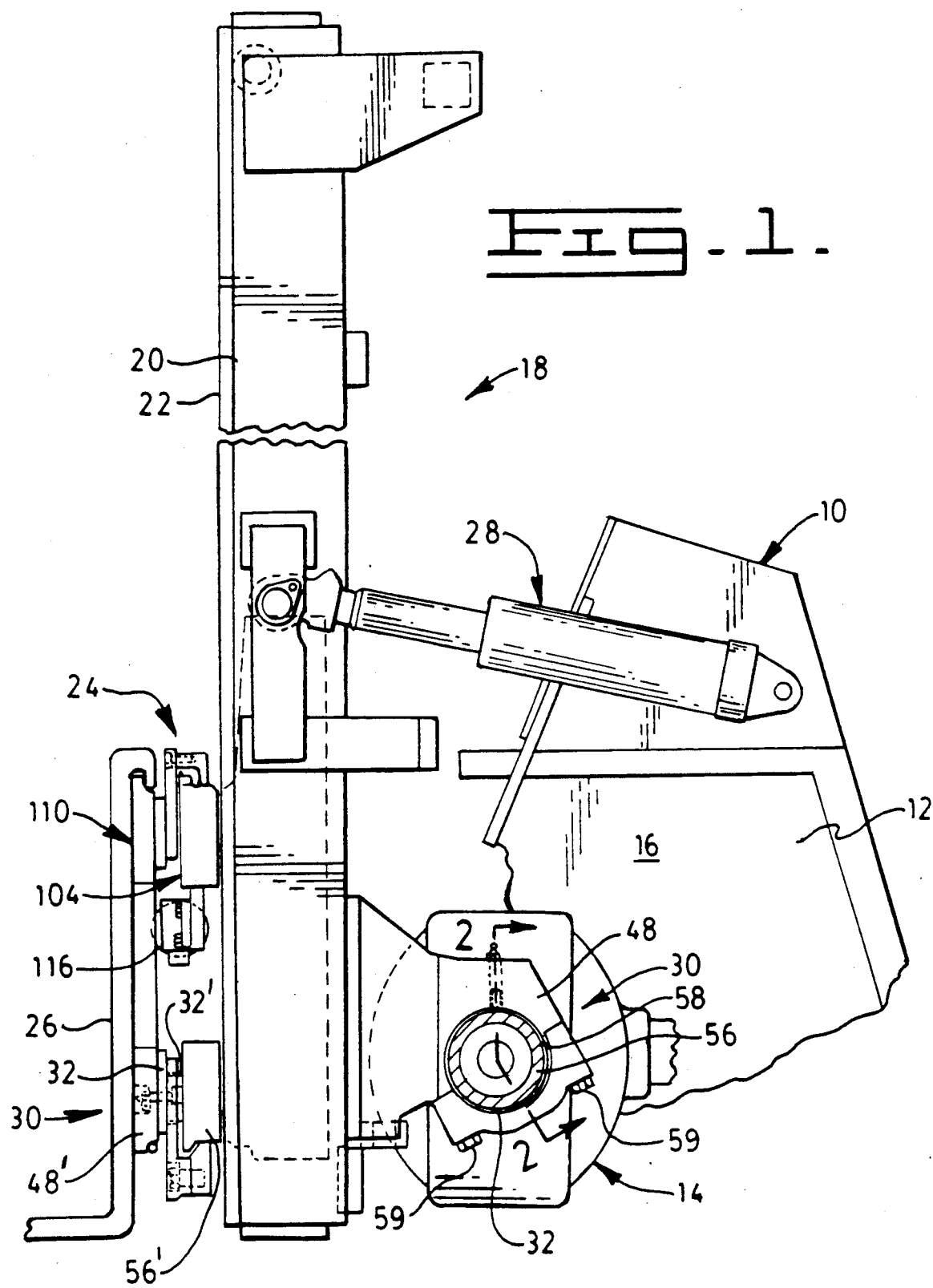
FIG. 1 discloses a diagrammatic side elevational view of first and second embodiments of the present invention showing for the first embodiment a bearing mounting arrangement for connecting a lift mast assembly to a first flange of a material handling vehicle and showing for the second embodiment a bearing mounting arrangement for mounting a bearing member to the first flange of a side shiftable frame of a carriage assembly.

With reference to the drawings, and particularly FIG. 1, a material handling vehicle 10 has a frame 12 and a drive axle assembly 14 connected to the frame 12 at a front end portion 16 of the frame 12. A lift mast assembly 18 is pivotally connected to the vehicle frame 12 for tipping movement in directions toward and away from the front end portion 16 of the vehicle. A pair of fluid operated tilt jacks 28 is connected to and between the vehicle frame 12 and a first pair of uprights 20, respectively, of the lift mast assembly. The fluid operated tilt jacks 28 tilt the lift mast assembly 18 about its pivotal connection so that the lift mast assembly 18 may be positioned to receive and deposit loads.

The lift mast assembly 18 has a second pair of spaced apart uprights 22, a side shiftable carriage assembly 24 connected to the second pair of spaced apart uprights 22 and guided by the second pair of uprights 22 for elevational movement, and a pair of spaced apart load engaging forks 26 (only one shown) connected to the side shiftable carriage assembly 24. The side shiftable carriage assembly 24 is elevationally moved in a conventional manner by a fluid operated jack (not shown) so that the load engaging forks 26 may be elevationally aligned to deposit or retrieve loads in a well known manner.

Figure 2:
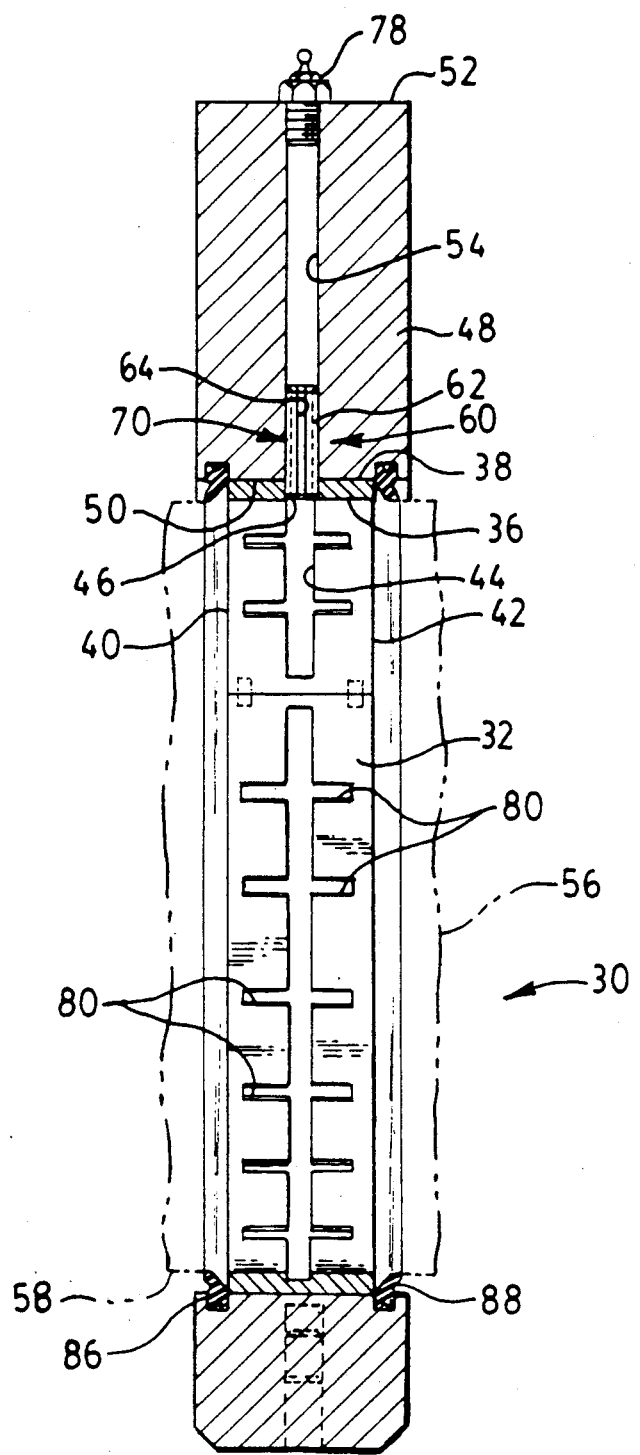
FIG. 2 is a diagrammatic sectional view taken along lines 2—2 of FIG. 1 showing the bearing mounting arrangement for mounting the lift mast assembly on the material handling vehicle in greater detail.
Figure 3:
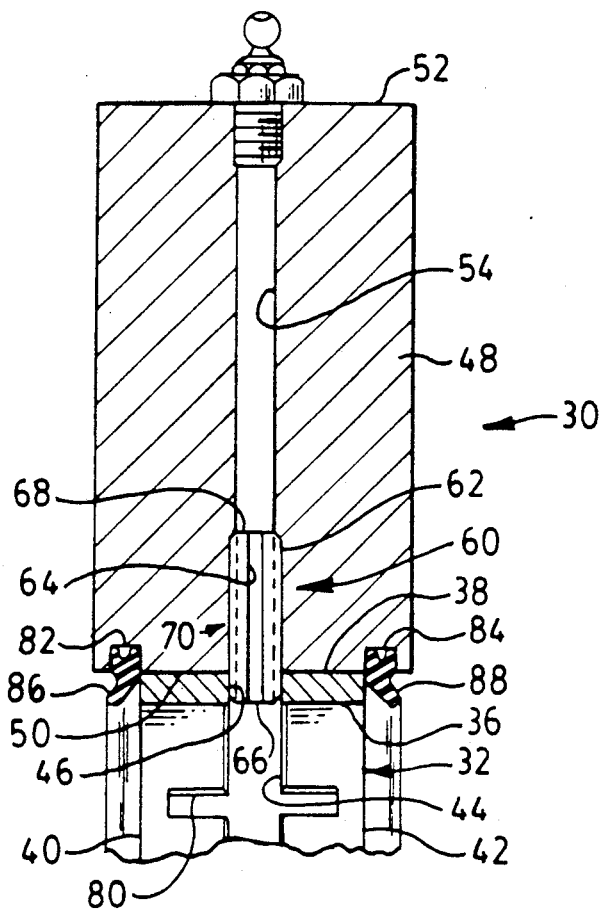
FIG. 3 is a diagrammatic enlarged detail of a portion of the bearing mounting arrangement of FIG. 2.
Figure 6:
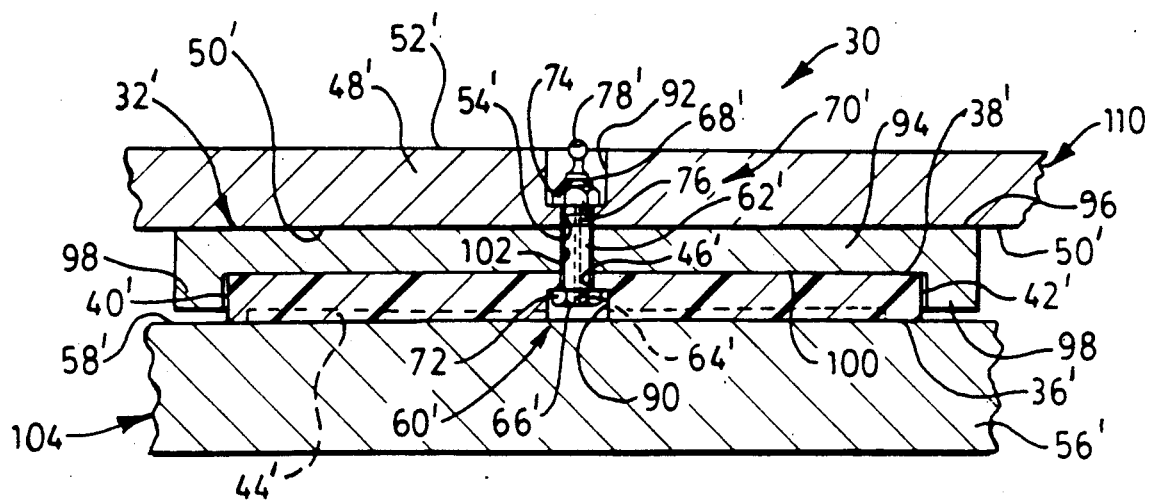
FIG. 6 is a diagrammatic enlarged crossectional view taken along lines 6—6 of FIG. 4 showing the second embodiment of the bearing mounting arrangement in even greater detail.

Referring to FIGS. 1-6, a bearing mounting arrangement 30 is provided for connecting a bearing member 32 to the lift mast assembly 18. It is to be noted that the bearing mounting arrangement 30 is used in at least two different locations on the lift mast assembly. In a first embodiment (as best seen in FIGS. 1-3), the bearing mounting arrangement 30 is used to pivotally connect the lift mast assembly 18 to the of the vehicle 10. In the second embodiment (as best seen in FIGS. 4-6), the bearing mounting arrangement 30 is used in a thrust bearing application for the side shiftable carriage assembly 24. Due to similarities in the design of the bearing mounting arrangement 30 of the first and second embodiments all common elements of the second embodiment will have the same reference numeral as similar elements of the first embodiment, followed by a prime (').

A bearing member 32,32' has first and second opposed surfaces 36,36',38,38', first and second sides 40,40',42,42' and a groove 44,44' disposed in the bearing member 32,32' and opening at the first surface 36,36'. An aperture 46,46' is disposed in the bearing member 32,32', passes through the bearing member 32,32', and opens at the first and second sides 40,40',42,42'. In particular the aperture 46,46' opens into the groove 44,44' so that a lubricant may pass into the groove 44,44'.

In each embodiment a first flange 48,48' has first and second surfaces 50,50',52,52' and an aperture 54,54' disposed therein. The aperture 54,54' extends through the first flange 48,48' and opens at the first and second surfaces 50,50',52,52'. The aperture 54,54' is positioned at a location on the first flange at which the bearing member 32,32' is to be mounted. The bearing member 32,32' is positioned on the first flange 48,48' with the bearing member second surface 38,38' being supported on the first flange member 48,48'. The aperture 46,46' of the bearing member 32,32' is aligned with the aperture 54,54' of the first flange 48,48'.

A second flange member 56,56' has a bearing surface 58,58' and is slidably engaged with the first surface 36,36' of the bearing member 32,32'. The bearing surface 58,58' is relatively smooth so that the coefficient of friction is minimized and sliding movement between the bearing member 32,32' and the bearing surface 58,58' is achieved with a substantially reduced force.

A retaining means 60,60' is provided for maintaining the bearing member 32,32' from sliding movement relative to the first flange 48,48' first surface 50,50' and for directing lubricating fluid through the aperture 54,54' in the first flange member 48,48', through the aperture 46,46' in the bearing member 32,32', and into the groove 44,44'.

The retaining means 60,60' is disposed in the aperture of the bearing and first flange members 32,32',48,48' and substantially aligns the apertures 46,46',54,54' in the bearing and first flange members 32,32',48,48' so that lubricating fluid is directed through the apertures and into the groove 44,44' in the bearing member 32,32'.

The retaining means 60,60' includes an elongated retaining member 62,62' having an aperture 64,64' longitudinally disposed therethrough. The elongated retaining member 62,62' is disposed in the apertures 46,46',54,54' of the first flange 48,48' and bearing members 32,32'. The aperture 64,64' in the elongated retaining member 62,62' is adapted to direct lubricant to the groove 44,44' in the bearing member 32,32' and reduce the possibility of lubricant from leaking at the juncture of second surface 38,38' of the bearing 32,32' and the first surface 50,50' of the first flange 48,48'.

The elongated retaining member 62,62' forcibly engages at least one of the first flange and the bearing members 48,48',32,32' and retains the elongated retaining member 62,62' in said apertures 46,46',54,54'. The elongated retaining member 62,62' also retains the bearing member 32,32' from movement in directions transverse the elongated retaining member 62,62'.

The elongated retaining member 62,62' has first and second longitudinally spaced apart ends 66,66',68,68'. The first end 66,66' is disposed in the aperture 46,46' of the bearing member 32,32' and between the first and second surfaces 36,36'38,38' of the bearing member 32,32' so that the retaining member is spaced from the second flange 56,56' and free from engagement with the bearing surface 58,58' of the second flange 56,56'.

The retaining means 60,60' includes securing means 70,70' for retaining said elongated retaining member 62,62 in the apertures 54,54',46,46' of said first flange and said bearing members 48,48,32,32'. In the first embodiment as shown in FIGS. 2 and 3 the elongated retaining member 62 is a spring pin and the securing means 70 includes the force of the spring pin acting against the bearing member 32 and/or the first flange 48. In the second embodiment as shown in FIGS. 4 and 6 the securing means 70' includes a head member 72 connected to the first end 66' of the elongated retaining member 62' and a nut member 74 screw threadably connected to a threaded end portion 76 of the elongated retaining member 62'. The head member 72 is forcibly engageable with the bearing member 32' and the nut member 74 is forcibly engageable with the first flange member 48'. The nut member 74 is adjustably connected to the threaded end portion 76, engageable with the first flange 48', and forcibly urges the bearing member 32' toward the first flange 48'.

With reference to FIGS. 1-3, the first embodiment of the present invention, the bearing mounting arrangement 30 is provided to connect the bearing member 32 to the drive axle assembly 14. The bearing member 32 is preferably a cylindrical split sleeve bearing of any suitable bearing material. The cylindrical bearing member 32 is disposed in a cylindrical bore defined by the first surface 50 of the first flange 48 and mounted on the bearing surface 58 of the second flange 56. The first flange 48 is split in two parts for mounting on the bearing surface 58 and also so that the bearing 32 may be assembled in the bore defined by surface 50. Threaded fasteners 59 connect the two parts together after assembly on the first surface 50. The first flange 48 is connected to one upright of the first pair of uprights 20 in any suitable manner, such as by welding, threaded fastener and the like. Although only a single bearing mounting arrangement 30 has been discussed with respect to the mounting of the lift mast assembly 18 on the drive axle assembly 14, it is to be noted that, a second bearing mounting arrangement (not shown) of identical construction is provided to mount the other upright of the first pair of uprights 20 on the drive axle assembly 14.

A fitting 78,78' of the conventional type is provided to facilitate the connection of an external pressurized source of lubricant (not shown), such as a grease gun. Fittings of this type have an internal ball check to pass fluid in one direction and stop the passing of fluid in the opposite direction.

In FIGS. 2 and 3, the fitting 78 is screw threadably connected to the first flange 48 at the second surface 52 and in the aperture 54. The fitting 78 passes a lubricant from the source and into the aperture 54 so that the lubricant may be passed under pressure to the bearing member 32. The groove 44 in the bearing member 32 receives the lubricant directed under pressure by the elongated retaining member 62 and directs the lubricant to the appropriate locations on the first surface 36 of the bearing member. To properly distribute lubricant across the first surface 36, a plurality of branch grooves 80 intersecting groove 44 is provided.

First and second spaced apart parallel seal retaining grooves 82,84 are radially disposed in the first flange 48. The first and second grooves 82,84 are radially open at the first surface 50. The bearing member 32 is disposed between the first and second grooves 82,84 and first and second lip type seals 86,88 are disposed in the first and second grooves 82,84 and engageable with the bearing surface 58 of the second flange. The seals 86,88 prevent dirt and contaminants from entering the area between the seals 86,88 and also reduce the potential for the drying out and hardening of the lubricant.

With reference to the second embodiment of the present invention, as best shown in FIG. 6, the fitting 78' is connected to the second end 68' of the elongated retaining member 62' and delivers lubricating fluid directly from the source of pressurized lubricant flow to the aperture 64' in the elongated retaining member 62. The lubricant by virtue of the aperture 64' is directed to the groove 44'. It is to be noted that the head member 72 of the elongated retaining member 62' is disposed in a counter bore 90 in the bearing member 32'. The counter bore 90 is open to the first surface 36', to the groove 44' and axially aligned with the aperture 46'. The head member 72 is disposed between the first and second surfaces 36,38' and does not extend to the surface 36'. This, damage to the head member 72 and the second flange 56' due to rubbing is prevented. The grove 44' is preferably a plurality of grooves 44' extending radially outward from the counterbore 90 in the bearing member 32' and opening at the first surface 36'. A counter bore 92 is also disposed in the flange 48'. Counter bore 92 is axially aligned with aperture 54' and open to receive the nut member 74 therein. Counter bore 92 serves to shield and protect the fitting 78' from impact with external objects.

The bearing mounting arrangement 30 includes a bearing carrier 94. The bearing carrier 94 has a first surface 96 a ridge 98 defining a recessed surface portion 100, and an aperture 102 disposed centrally in the recessed surface portion 100 of the bearing carrier 94 and opening at the first surface 96 and recessed surface 100. The bearing member 32' is disposed in the recessed surface portion 100 and retained by the ridge 98 from movement in directions along the recessed surface 100 and transverse the ridge 98. The elongated retaining member 62' is disposed in the aperture 102 and forcibly urges the bearing member 32' in a direction toward the recessed surface portion 100 and the bearing carrier 94 against the first surface 50' of the first flange 48'. It should be noted that the bearing carrier 94 may be eliminated in certain applications, such as light material handling applications, without departing from the spirit of the application. In such applications the bearing member 32' second surface 38' will bear directly against the first surface 50' of the first flange 48'.

With reference to FIGS. 4 and 5, the side shiftable carriage assembly 24 has a carriage frame 104. The carriage frame 104 has a pair of elevationally oriented spaced apart roller brackets 106 which are rollingly guidably connected to the second pair of urights 22 for elevational movement. The carriage frame 104 has an elongated guide rail 108 connected to the pair of roller brackets 106 in any suitable manner. The second flange member 56' is also connected to the pair of roller brackets 106. The elongated guide rail 108 is elevationally spaced from the second flange member 56' and substantially parallel thereto. A side shiftable frame 110 having a hooklike end portion 112 is hung on the elongated guide rail 108 and movable along the guide rail 108 in directions transverse the uprights 20,22. The elongated guide rail 108 has a bearing member 114 connected thereto. The bearing member, of any suitable material, is disposed between the hooklike end portion 112 and the guide rail 108 and provides for friction free movement of the side shiftable frame 110. The first flange member 48' is connected to the side shiftable frame 110 at an elevational location spaced from the elongated guide rail 108 at which the first flange member 48' is aligned with the second flange member 56'. The bearing member 32', which is connected to the first flange member 48' is slidably engaged with the second flange member 56' and movable along the second flange member 56' in response to movement of the side shiftable frame 110 along the elongated guide rail 108. The load engaging forks 26 are hung on the side shiftable frame 110 in a conventional manner.

A side shifting fluid operated jack 116 is connected to and between the side shiftable frame 110 and the carriage frame 104 and moves the side shiftable frame 110 along the elongated guide rail 108 so that the load engaging forks 26 may be aligned with a load to be lifted or a rack or the like at which a load is to be deposited without changing the position of the pair of forks 26 relative to each other. The bearing mounting arrangement 30 passes thrust loads from the side shiftable frame 110 to the carriage frame 104 and reduces the coefficient of friction between the side shiftable frame 110 and carriage frame 104 so that smooth, low force side shifting may be provided.

The bearing carrier 94 has an extension portion 118 which extends elevationally past the second flange 56'. A finger 120 is attached to the extension portion 118 in any suitable manner, such as by threaded fasteners 122. The finger 120 and the hook like end portion 112 retains the side shiftable frame 110 on the carriage frame 104 and prevents inadvertent separation thereof. The finger 120 also limits the allowable amount of tipping movement of the side shiftable frame 110 in directions away from the carriage frame 104.

INDUSTRIAL APPLICABILITY

With reference to the drawings, it is necessary to pivotally connect the lift mast assembly 18 to the vehicle frame 12 and more particularly to the second flange member 56 so that the lift mast assembly 18 may be pivoted for load pick up and deposit purposes. The bearing mounting arrangement 30 is provided for achieving this connection in an efficient and effective manner while maximizing the life of the bearing member 32 and the integrity of the connection. Since the retaining means 60 maintains the bearing member 32 in position and from sliding movement relative to the first surface 50 and insures that the aperture 54 in the first flange 48 and the aperture 46 in the bearing member 32 remain aligned during assembly and operation, the potential for premature wear is reduced. This is primarily due to the fact that the retaining means 60 directs lubricant from the aperture 54, into the groove 46, and to the proper bearing area, between bearing surface 36 and 58, and restricts the leakage of lubricant at the juncture of the surface 38 and 50. Also, because the bearing member 32 is retained from slippage relative to the first flange 48, undesirable wear of the bearing second surface 38 is prevented.

To lubricate the bearing member 32 one simply connects the source of pressurized lubrication to the fitting 78 and forces lubricant through apertures 54,64 and into groove 44. The seals 86,88 serve to retain the lubricant between the seals 86,88 and to prevent contamination of the area between the seals by dirt and the like and also reduces the possibility of the lubricant drying out and plugging the passageways.

Since the first flange 48 is segmented in two parts removal of the lift mast assembly 18 is achieved by simply removing the threaded fasteners 59 and lifting the lift mast assembly 18 from being supported on the bearing surface 58.

In the second embodiment, the side shiftable carriage assembly 24, the bearing mounting arrangement 30 provides for smooth and low effort movement of the side shift frame 110. Because the groove 44' in the bearing member 32' receives lubricant directly from the retaining means 60' the potential for leakage of lubricant to other areas of the bearing member 32' is substantially reduced. Since the lubricant is directed to the proper area of the bearing member 32' an adequate amount of lubrication is available to provide for low friction operation.

Since the bearing member 32' is retained by the retaining means 60 from movement in directions parallel to first surface 50' of the first flange 48' the potential for undesirable wear and binding of the side shift frame 110 relative to the carriage frame 104 due to dislodging of the bearing member 32' is prevented.

Other aspects, objects and advantages of the present invention can be obtained from a study of the drawings, the disclosure and the appended claims.

We claim:
1. A bearing mounting arrangement, for a lift mast assembly, comprising:
 a bearing member having first and second opposed surfaces, a groove disposed in the bearing member and opening at the first opposed surface, and an aperture disposed in the bearing member and opening into the groove;

a first flange member having first and second surfaces and an aperture disposed therein and opening at said first and second surfaces;

a second flange member having a bearing surface, said second flange member bearing surface being engaged with the bearing member first surface and being slidably movable relative to the bearing member; and retaining means for maintaining the bearing member from sliding movement relative to the first flange member first surface and directing lubricating fluid from the first flange member aperture, through the bearing member aperture, and into the groove.

2. A bearing mounting arrangement, as set forth in claim 1, wherein said retaining means is disposed in the aperture of the bearing and first flange members, said retaining means substantially aligning the apertures in the bearing and first flange members so that lubricating fluid is directed by the retaining means through the apertures in the bearing and first flange members and into the groove in the bearing member.

3. A bearing mounting arrangement, as set forth in claim 2, wherein said retaining means includes an elongated retaining member having an aperture longitudinally disposed therethrough, said elongated retaining member being disposed in the apertures of the first flange and the bearing members, said aperture in the elongated retaining member being adapted to direct lubricant to the groove in the bearing member.

4. A bearing mounting arrangement, as set forth in claim 3, wherein said elongated retaining member forcibly engages at least one of the first flange and the bearing member and retains the elongated retaining member in said apertures of the bearing and first flange members.

5. A bearing mounting arrangement, as set forth in claim 3, wherein said elongated retaining member is a spring pin.

6. A bearing mounting arrangement, as set forth in claim 3, wherein said retaining means includes securing means for maintaining said elongated retaining member in the apertures of said first flange and bearing members.

7. A bearing mounting arrangement, as set forth in claim 6, wherein said elongated retaining member has first and second ends and a threaded end portion, said securing means including:

a head member connected to the first end of the elongated retaining member; and a nut member screw threadably connected to the threaded end portion of the elongated retaining member, said head end portion being engageable with the bearing member and said nut member being engageable with the first flange member.

8. A bearing mounting arrangement, as set forth in claim 7, including a lubrication receiving fitting connected to the second end of the elongated retaining member, said lubrication receiving fitting being adapted to be connected to a source of pressurized lubricant flow, to receive lubricant from said source, and to pass lubricant directly to the aperture of the elongated retaining member.

9. A bearing mounting arrangement, as set forth in claim 2 including lubrication receiving fitting connected to said first flange, said lubrication receiving fitting being adapted to be connected to a source of pressurized lubricant flow, to receive lubricant from the source, and to pass lubricant to the aperture in the first flange member.

10. A bearing mounting arrangement, as set forth in claim 1, wherein the first surface of the first flange member is defined by a cylindrical bore disposed in the first flange member.

11. A bearing mounting arrangement, as set forth in claim 10, wherein the bearing member is a cylindrical sleeve bearing disposed in the cylindrical bore of the first flange member.

12. A bearing mounting arrangement, as set forth in claim 11, including:

first and second spaced apart parallel radially oriented grooves disposed in the first flange member and opening at the first surface of the first flange member; and first and second lip seals disposed in the first and second radially oriented grooves and engaging the second flange member, said bearing member being disposed axially between the first and second lip seals.

13. A bearing mounting arrangement, as set forth in claim 3, wherein said elongated retaining member has first and second ends, said elongated retaining member first end being located in the aperture of the bearing member between the first and second surfaces of the bearing member.

14. A bearing mounting arrangement, as set forth in claim 7, wherein the bearing member includes a counter bore, said head member being disposed in the counter bore and between the first and second surfaces of the bearing member.

15. A bearing mounting arrangement, as set forth in claim 14, wherein said nut member being engageable with the first flange member, said nut member urging the bearing member toward the first flange member.

16. A bearing mounting arrangement, as set forth in claim 7, including:

a bearing carrier having a first surface, a ridge defining a recessed surface portion in the bearing carrier and an aperture disposed in the bearing carrier and opening at the first and recessed surfaces of the bearing carrier;

said bearing member being disposed in recessed portion and retained by said ridge from movement in directions along the recessed surface portion; and said elongated retaining member being disposed in the aperture of said bearing carrier and forcibly urging said bearing member in a direction toward said recessed surface portion and said bearing carrier against the first surface of the first flange member.

17. A lift mast assembly, comprising:

a bearing member having first and second opposed surfaces, a groove disposed in the bearing member and opening at the first opposed surface, and an aperture disposed in the bearing member and opening into the groove;

an elongated retaining member having first and second ends and an aperture longitudinally disposed in said elongated retaining member and opening at said first and second ends;

a first flange member having first and second surfaces and an aperture disposed in the first flange member and opening at said first and second surfaces, said bearing member second surface facing the first surface of the first flange member, said elongated retaining member being disposed in the apertures of both the first flange member and the bearing member and maintaining the bearing member from sliding movement relative to the first flange member first surface, said aperture in the elongated retaining member being adapted to direct a lubricant from the first flange member aperture to the groove; and a second flange member having a bearing surface, said bearing surface of the second flange member being slidably engaged with the first surface of the bearing member.

18. A lift mast assembly, as set forth in claim 17, including an upright member, said first flange member being connected to said upright and said upright being pivotable about the bearing surface of the second flange member.

19. A lift mast assembly, as set forth in claim 18, wherein the bearing surface of the second flange member and the first surface of the bearing member are cylindrical, said first surface of the bearing member and the bearing surface of the second flange member being slidably engaged with each other, and said first flange member being rotatable about the bearing surface of the second flange member.

20. A lift mast assembly, as set forth in claim 9, wherein the first surface of the first flange member is defined by a cylindrical bore disposed in the first flange member, said cylindrical bore being oriented in a direction axially transverse the aperture disposed in the first flange member.

21. A lift mast assembly, as set forth in claim 17, wherein said elongated retaining member forcibly engages at least one of the first flange and the bearing member and retains the elongated retaining member in said apertures of the bearing and first flange members.

22. A lift mast assembly, as set forth in claim 17, including a fitting connected to said first flange member, said fitting being adapted to be connected to a source of pressurized lubricant flow, to receive lubricant from the source, and to pass lubricant to the aperture in the elongated retaining member.

23. A lift mast assembly, as set forth in claim 20, including:

first and second spaced apart parallel seal retaining grooves radially disposed in the first flange member and opening at the first surface of the first flange member; and first and second lip seals disposed in the first and second seal retaining grooves and engaging the second flange member, said bearing member being disposed axially between the first and second lip seals.

24. A lift mast assembly, as set forth in claim 17, including:

a pair of spaced apart uprights;

a carriage frame having an elongated guide rail, said second flange member being connected to said carriage frame at a location elevationally spaced from the elongated guide rail, said carriage frame being movably connected to the pair of spaced apart uprights and elevationally movable along said pair of uprights, said guide rail being oriented transverse the pair of uprights; and a side shiftable frame supported on the guide rail and moveable along the guide rail in directions transverse the pair of uprights, said first flange member being connected to the side shift frame at an elevation location spaced from said guide rail, said bearing member being adapted to pass thrust loads from the side shift frame to the carriage frame and permit slidable movement of the side shift frame along the elongated guide rail.

25. A lift mast assembly, as set forth in claim 24, wherein said elongated retaining member has first and second ends and a threaded end portion said retaining means including:

a head member connected to the first end of the elongated retaining member; and a nut member screw threadably connected to the threaded end portion of the elongated retaining member, said head member being engaged with the bearing member and said nut member being engaged with the first flange member.

26. A lift mast assembly, as set forth in claim 17, including a fitting connected to the second end of the elongated retaining member, said fitting being adapted to be connected to a source of pressurized lubricant flow, to receive lubricant from the source, and to pass lubricant directly to the aperture of the elongated retaining member.

* * * * *